(12) United States Patent
Koraichi et al.

(10) Patent No.: US 8,464,941 B2
(45) Date of Patent: Jun. 18, 2013

(54) METHOD AND TERMINAL FOR PROVIDING CONTROLLED ACCESS TO A MEMORY CARD

(75) Inventors: Najib Koraichi, Schimmert (NL);
Sebastiaan Hoeksel, Maastricht (NL);
Aguibou Mountaga Barry, Maastricht (NL)

(73) Assignee: Vodafone Holding GmbH, Dusseldorf (DE)

( * ) Notice: Subject to any disclaimer, the term of this patent is extended or adjusted under 35 U.S.C. 154(b) by 0 days.

(21) Appl. No.: 12/577,270

(22) Filed: Oct. 12, 2009

(65) Prior Publication Data

US 2010/0090001 A1    Apr. 15, 2010

(30) Foreign Application Priority Data

Oct. 13, 2008 (EP) ..................................... 08017899

(51) Int. Cl.
*G06K 5/00* (2006.01)

(52) U.S. Cl.
USPC .......................... 235/382; 235/382.5; 235/487

(58) Field of Classification Search
USPC .............. 235/382, 375, 487, 376, 382.5, 380, 235/492
See application file for complete search history.

(56) References Cited

U.S. PATENT DOCUMENTS

| | | | |
|---|---|---|---|
| 7,891,557 B2 * | 2/2011 | Brown et al. | 235/380 |
| 8,127,999 B2 * | 3/2012 | Diamond | 235/492 |
| 2003/0224823 A1 * | 12/2003 | Hurst et al. | 455/558 |
| 2005/0182710 A1 * | 8/2005 | Andersson et al. | 705/39 |
| 2005/0282584 A1 * | 12/2005 | Faisy | 455/558 |
| 2007/0114274 A1 * | 5/2007 | Gibbs et al. | 235/380 |
| 2007/0228154 A1 * | 10/2007 | Tran | 235/380 |
| 2008/0073426 A1 * | 3/2008 | Koh et al. | 235/380 |
| 2008/0119229 A1 * | 5/2008 | Lee | 455/558 |
| 2008/0205392 A1 * | 8/2008 | Danzeisen et al. | 370/389 |
| 2009/0092127 A1 * | 4/2009 | Gruber et al. | 370/352 |
| 2009/0093271 A1 * | 4/2009 | Martin et al. | 455/558 |

\* cited by examiner

*Primary Examiner* — Edwyn Labaze
(74) *Attorney, Agent, or Firm* — International IP Law Group, PLLC

(57) ABSTRACT

There is provided a method for providing access to data securely stored in a memory card. An exemplary method comprises receiving the memory card in a terminal. The exemplary method also comprises transmitting a request for accessing the data via a communication link from the terminal to a device. The exemplary method additionally comprises sending first information from the device to the terminal via the communication link upon receipt of the request. In addition, the exemplary method comprises receiving the first information in the terminal and accessing the data using the first information.

14 Claims, 1 Drawing Sheet

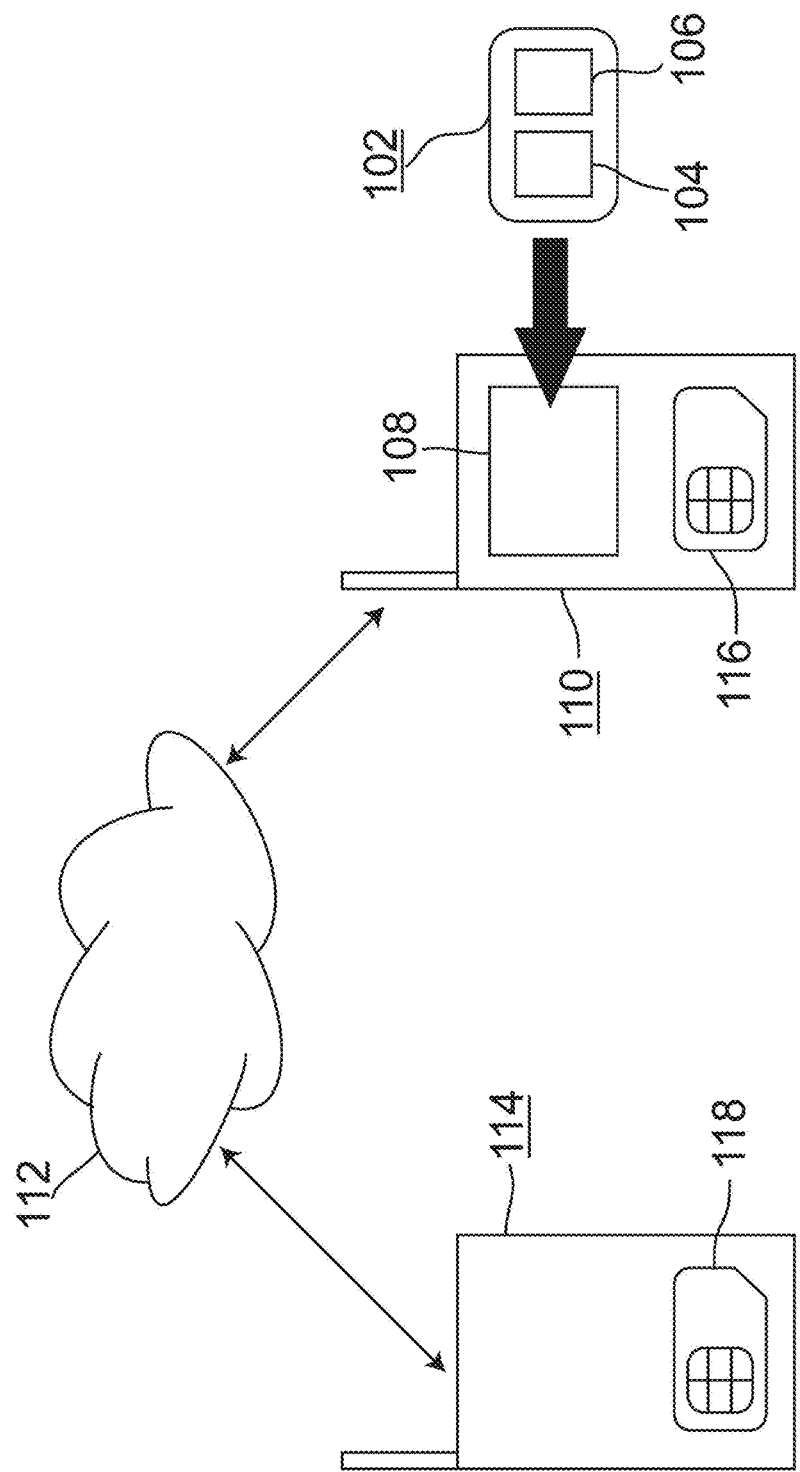

METHOD AND TERMINAL FOR PROVIDING CONTROLLED ACCESS TO A MEMORY CARD

CROSS REFERENCE TO RELATED APPLICATION

This application claims priority to European (EP) Patent Application No. 08017899.9, filed on Oct. 13, 2008, the contents of which are incorporated by reference as if set forth in their entirety herein.

BACKGROUND

Memory cards are integrated circuit (IC) cards including non-volatile memory and a controller, which controls the operation of the memory card. Such memory cards can be temporarily connected to host devices, such as, for example, personal computers (PCs), cellular telephones, personal digital assistants (PDAs), digital cameras, portable audio players and other host electronic devices for storage of data. A plurality of standards exists that specify different types of memory cards, such as, for example, SD (Secure Digital) cards, CF (Compact Flash) cards and MMCs (Multimedia Cards). A further example of a memory card, in the sense the term is used herein, is a USB (Universal Serial Bus) flash memory stick.

Memory cards of the type described before may provide a security mechanism for protecting data from unauthorized access. This allows for storing sensitive data in the memory card, such as, for example, banking details of the card owner, medical data of the card owner and personal photographs or other personal data.

The card owner may access the data using a credential, such as, for example, a password. However, the user may wish to make the protected data accessible for certain persons in some situations. For instance, the card owner may wish to allow his doctor to read protected medical data stored in the memory card or to make personal photos available to a friend.

SUMMARY OF THE INVENTION

Exemplary embodiments of the present invention relates to memory cards with access protection. More specifically, an exemplary embodiment of the invention may relate to a method and a system for providing access to data stored on such a memory card. Moreover, an exemplary embodiment of the invention may relate to a terminal for accessing data stored in a memory card.

An exemplary embodiment of the present invention may allow an owner of a memory card to make protected data stored in the memory card accessible to another person.

In one exemplary embodiment of the invention, a method for providing access to data securely stored in a memory card is suggested. The method comprises the following steps:
  receiving the memory card in a terminal;
  transmitting a request for accessing the data via a communication link from the terminal to a device;
  upon receipt of the request, sending first information from the device to the terminal via the communication link;
  receiving the first information in the terminal and accessing the data using the first information.

In another exemplary embodiment of the invention, a terminal for accessing data securely stored in a memory card is provided. The exemplary terminal comprises:
  an acceptance device adapted to receive the memory card;
  a reading device adapted to read the data from the memory card using first information;
  a sending component adapted to send a request for accessing the data via a communication link;
  a receiving component adapted to receive the first information via the communication link in response to the request.

In an exemplary embodiment of the present invention, an access to the memory card inserted into a terminal is allowed using a device that can communicate with the terminal via a communication link. The device may be a device of the card owner so that the card owner is able to remotely control the access to the memory card. Here, the term remotely does not necessarily mean that there is a great distance between the device and the terminal, but that the access to the memory card can be controlled from outside the terminal.

In one exemplary embodiment of the method and the terminal, the first information is sent to the terminal in response to a user operation acquired using a user interface of the device. In this exemplary embodiment, the card owner can directly give his consent or decline his consent to each individual access to the memory card.

In a further exemplary embodiment of the method and the terminal, the device comprises a mobile communication device and the communication link comprises a mobile communication network. In this exemplary embodiment, the card owner can use his mobile communication device to unlock the memory card for being accessed by means of the terminal. Thus, he can use a device that he usually already carries for controlling access to the memory card.

In another exemplary embodiment of the method and the terminal, a SIM card provides the first information. In this exemplary embodiment, the SIM card inserted into the mobile communication, which provides a security environment for storing data and performing tasks, can be used to securely store the first information and to provide the information to the terminal.

In a further exemplary embodiment of the method and the terminal, the communication link from the terminal to the device may be established using second information, said second information being read from the memory card by the terminal. In this exemplary embodiment, the terminal can automatically establish a communication link to the device so that there is no need to provide information for establishing the communication connection to the terminal via another channel.

In another exemplary embodiment, the second information comprises an MSISDN (Mobile Subscriber Integrated Services Digital Network Number) of the device.

In order to prevent tampering, it may help to be able to determine that the request for accessing the memory card actually originates from the terminal into which the memory card is inserted. Therefore, in one exemplary embodiment of the method and the terminal, the request for accessing the data includes a digital signature of the memory card, said digital signature being verified in the device, particularly in the SIM card contained in the device.

In one exemplary embodiment of the method and the device, the data may be stored in the memory card in encrypted form and the first information may comprise a cryptographic key for decrypting the data.

In a further exemplary embodiment of the method and the device, the memory card comprises a security logic allowing accessing the data after having successfully verified the first information. Such a security mechanism may protect the data instead of the encryption, which may be used in the exemplary embodiment mentioned before. However, it may also be provided in addition to the encryption in order to further increase the security.

Furthermore, in one exemplary embodiment of the method and the terminal, the memory card comprises further data, which are not accessible using the first information. In this exemplary embodiment, the access can be granted to selected data stored in the memory card, while other data remain inaccessible.

According to another exemplary embodiment of the invention, a system for providing access to a memory card is provided. The system comprises the terminal of the type described before and a device, said device comprising an authorising device that is adapted to provide the first information in response to a receipt of the request from the terminal.

In one exemplary embodiment of the system, the device further comprises a user interface coupled to the authorising device, the authorising device being adapted to provide the first information in response to a user operation acquired using the user interface.

BRIEF DESCRIPTION OF THE DRAWINGS

Reference will be made by way of example to the accompanying drawings in which:

FIG. 1 is a block diagram of a system for controlling access to protected data stored on a memory card according to an exemplary embodiment of the present invention.

DETAILED DESCRIPTION OF SPECIFIC EMBODIMENTS

FIG. 1 schematically depicts elements of a system for controlling access to data stored on a memory card 102. In particular, the memory card 102 stores sensitive data of the card owner. In the system shown in FIG. 1, the card owner can make such data accessible to authorized persons, while unauthorized third parties are prevented from accessing the data. In principle, the data may be any data the owner wants to share with selected persons. For instance, the data are medical data of the card owner, which the card owner wishes to share only with a doctor. Another example is banking details the card owner wishes to provide only to trustworthy persons. In a yet further example, personal data are concerned, such as, for example, personal photos, the card owner wants to share only with friends.

The memory card 102 comprises a memory 104 and a microcontroller 106 integrated into a housing. The housing may be small enough so that the owner can carry the memory card 102 easily and that the memory card 102 can be used in connection with card readers, which are integrated into small devices, such as, mobile communication devices. The memory card 102 may be configured according to a standard format, and may be an SD card, a CF card, a MMC or the like. Another example of a memory card format in sense of this disclosure is a USB flash memory device. The standard format may particularly determine the size and shape of the memory card 102, the configuration of its electric contacts and the communication protocols used in the communication with the memory card 102. The standard compliance of the memory card 102 allows the card to be accessed using a card reader device, which is likewise compliant with the standard.

The memory 104 may comprise a non-volatile storage that can be electrically erased and reprogrammed. Particularly, the memory 104 may be configured as a solid state storage unit, particularly a flash memory or as non-flash EEPROM (Electrically Erasable Programmable Read-Only Memory). However, the person skilled in the art understands that in principle any sort of memory device may be used. The memory 104 may be constituted by one or more memory chips, which are arranged in the housing of the memory card 102. The microcontroller 106 and the memory 104 may reside on one single chip within the memory card 102, or the microcontroller may be a separate chip connected to the memory 104.

The microcontroller 106 provides functionality for accessing the memory 104 using devices to which the memory card 102 is connected. In particular, the microcontroller 106 implements the communication protocols used for the data exchange between the memory card 102 and a connected device.

At least the part of the data content of the memory 104 comprising the sensitive data of the owner is protected against unauthorized access, i.e. the unauthorized reading and manipulating of the protected data. In one exemplary embodiment, the microcontroller 106 also provides a security logic controlling access to the protected data. Each attempt to access the protected data stored in the memory 104 is either allowed or denied by the authentication unit. The security logic of the microcontroller 106 permits accessing the data only after a credential has been provided and successfully verified. The credential may be a personal code, such as a password or a PIN (Personal Identification Number), or a digital signature, for example. Alternatively, the protected data may be stored in the memory card 102 in an encrypted form so that a cryptographic decryption key has to be used for reading the data. However, compared to the mere encryption of the data, the access control via the microcontroller 106 may prevent an unauthorized manipulation of the data, when the microcontroller 106 only permits reading access to protected data. A writing access may require a further credential, which is only known to the card owner.

In addition to the protected data, there may be stored in the memory card 102 further data, which are not particularly secured. Regarding the protected data, a group management may optionally be provided. This means that different groups of protected data are stored in the memory card 102, where different access authorisations can be configured for the groups. This may be achieved by allocating different credentials to the groups or by encrypting the data of different groups in such a way that they can be decrypted with different decryption keys. The group management allows for storing in the same memory card 102 data the owner wants to share with different people. For instance, the owner can store health data for sharing with his or her doctor and data for sharing with friends on the same memory card 102.

For accessing the protected data stored in the memory card 102, a card reader unit 108 is used, which is coupled to a terminal 110 of the person who wants to access the protected data. The terminal 110 is connected to a communication network 112, which may comprise a mobile communication network, as is assumed hereinafter. Particularly, the mobile communication network 112 may be configured according to the GSM (Global System for Mobile Communications) standard or according to the UMTS (Universal Mobile Telecommunications System) standard. However, the mobile communication network 212 may likewise adopt another mobile communications technology.

The card reader unit 108 may be integrated into the terminal 110 as it is depicted in FIG. 1, or the card reader unit 108 may be a separate unit connected to the terminal 110. In one exemplary embodiment, the terminal 110 may be a mobile communication device, such as, for example a mobile phone, a personal data assistant (PDA) or the like. Such devices often have an integrated card reader unit 108 for accepting memory cards of certain standard formats, such as the formats mentioned before.

The owner of the memory card 102 also disposes of a device 114, which is connectable to the mobile communication network 112. Owner's device 114 may likewise be a mobile communication device, such as a mobile phone, a PDA or the like. Optionally, the mobile communication device 114 of the memory card owner also has a card reader unit for accepting the memory card 102. This allows the card owner to use the memory card 102 together with his mobile communication device 114 for storing and accessing personal data. Furthermore, the card owner may have the memory card 102 inserted in his mobile communication device 114 during the normal use of the mobile communication device 114. In this case, the card owner has the memory card 102 at his disposal at the time he carries his mobile communication device 114.

For connecting to the mobile communication network 112 the terminal 110 and the mobile communication device 114 of the card owner comprise a smartcard 116, 118, which provides a service for identifying and/or authenticating the users of the devices 110, 114 to the mobile communication network 112. If the mobile communication network 112 is a GSM network, the smartcards 116, 118 are each configured as a SIM (Subscriber Identity Module) card according to the GSM standard comprising a SIM application, which provides the identification and authentication service. If the mobile communication network 112 is a UMTS network, the smartcards 116, 118 are each configured as a UICC (Universal Integrated Circuit Card) comprising a USIM (Universal Subscriber Identification module) application providing the identification and authentication service. The SIM or USIM application comprises a software code that is stored in the memory of the smartcards 116, 118 and executed using the microprocessor.

In the following, the smartcards 116, 118 are referred to as SIM cards. However, the term SIM card, as used herein, is to be understood as including also smartcards 116, 118 comprising USIM applications or corresponding applications providing authentication and/or identification functions in connection with a mobile communication network 112.

In addition to the components already described, the terminal 110 and the mobile communication device 114 particularly may comprise a radio module, which is used for connecting the devices 110, 114 to the mobile communication network 112 via radio access network. The devices 110, 114 may be operated using an input unit, such as, for example, a keypad, and a display unit, such as, for example, a monitor. The components of each device 110, 114 may be connected to a microprocessor, which controls the operation of the devices 110, 114. The microprocessor executes software programs which are stored in a memory unit of the device 110, 114.

When the owner of the memory card 102 wishes to make his protected data accessible to the user of the terminal 110, he hands over the memory card 102 to the user of the terminal 110, and the user inserts the memory card 102 into the card reader unit 108 of the terminal 110. As described before, the user of the terminal 110 may be a doctor who is in need of health data securely stored in the memory card 102, or the user of the terminal 110 may be someone to whom the card owner wants to make personal data accessible.

The terminal 110 comprises an access component, for accessing the protected data stored in the memory card 102. The access component may be configured as a software application comprising a software code, which is stored and executed in the terminal 110. In one exemplary embodiment, the software application may be run on the microprocessor of the terminal 110. In a further exemplary embodiment, the software application may be stored and executed in the SIM card 116 of the terminal 110. In such an exemplary embodiment, the software application may be executed in a secure environment, which is already provided in the terminal 110 by the SIM card. Furthermore, the software application— which has a strong relation to the mobile communication network 112—can be pre-installed on the SIM card so that it is provided together with the SIM card by the mobile network operator.

When the memory card 102 is inserted into the card reader unit 108 of the terminal 110, the access component of the terminal 110 recognizes that the memory card 102 has protected data stored therein, which can be accessed using a credential that is verified in the memory card 102 or using a decryption key for decrypting the data. The credential or the decryption key is provided by the mobile communication device 114 of the owner of the memory card 102 upon request. The request is generated in the access component of the terminal 110 after the memory card 102 has been inserted into the card reader module 108.

If multiple groups of protected data are stored in the memory card 102, the request includes information specifying the group to be accessed. In one exemplary embodiment, the group may be identified automatically by the access component. This requires that the data belong to one group of multiple predetermined groups, which are allocated to predetermined identification codes. Furthermore, the group for which the user of the terminal 110 has access authorisation in principal is specified in configuration data of the access component thereby allowing the access component to identify that group. This exemplary embodiment may be advantageous, if there are one or more predetermined groups of persons or organizations, such as, for example, doctors. In this case, special SIM cards 116 could be issued to the predetermined persons or organizations, and such SIM cards 116 could include functionality for accessing one group of data allocated to the group of persons or organizations.

In another exemplary embodiment, the access component presents the groups existing on the memory card 102 at the display unit of the terminal 110 and the user of the terminal 110 uses the input unit of the terminal 110 to select the group he wants to access.

The request generated by the access component is addressed to the mobile communication device 114 of the card owner. This may be done using the MSISDN of the card owner, which uniquely identifies the subscription of the card owner in the mobile communication network 112. The MSISDN may be stored in the memory card 102 and read from the memory card 102 by the access component. However, it is likewise possible that the user of the terminal 110 enters the MSISDN manually using the input unit.

In one exemplary embodiment, the memory card 102 digitally signs the request before it is sent to the card owners mobile communication device 114. For this purpose, the memory card 102 provides a suitable application, which is executed in the microcontroller 106 of the memory card 102. The digital signature is encrypted using a private cryptographic key, which is part of an asymmetric key pair allocated to the memory card 102 and which is securely stored in the memory card 102. The corresponding public key of the key pair is stored in the mobile communication device 114 of the card owner and used for verifying the digital signature included in the request.

After having generated the request and—if applicable—the optional digital signature has been added, the access component instructs the terminal 110 to send the request to the mobile communication device 114 of the owner of the memory card 102 via the mobile communication network 112.

The communication between the terminal 110 and the mobile communication device 114 may be based on any bearer service provided in the mobile communication network 112. Particularly, a bearer service for non-speech data may be used, such as SMS (Short Message Service), USSD (unstructured supplementary services data), CSD (circuit switched data), HSCSD (high speed circuit switched data) or GPRS (general packet radio system). However, it may likewise be provided to exchange information in the form of speech data using a corresponding bearer service of the mobile communication network 112.

When the request is received in the mobile communication device 114, it is forwarded within the mobile communication device 114 to an authorisation component. The authorisation component may also be configured as a software application that is stored and executed in the mobile communication device 114. Particularly, the software application may be executed in the microprocessor of the mobile communication device 114. Alternatively, the SIM card 118 inserted into the mobile communication device 114 may provide the authorisation component. This means that the corresponding software application is stored and executed in the SIM card 118. In particular, this exemplary embodiment has again the advantage that the SIM card 118 already provides a secure environment for running the application and that the application can be provided by the mobile network operator together with the SIM card 118.

If the request is digitally signed by the memory card 102, the authorisation component verifies the digital signature after having received the request. For the purpose of verifying the digital signature, the public key allocated to the memory card 102 is stored in the mobile communication device 114. If the authorisation component is provided by the SIM card 118, the public key may also be stored in the SIM card 118. If the digital signature cannot be verified successfully, the request is not answered. In particular, this means that the credential or key, which is necessary to access the protected data stored in the memory card 102, is not transmitted to the terminal 110. Furthermore, the card owner may be informed about the invalid digital signature by presenting corresponding information on the display unit of the mobile communication device 114. This informs the card owner that possibly an unauthorized person tries to access the protected data stored in the memory card 102.

If the digital signature has been verified successfully, the authorisation component may inform the card owner about the request. This may be done by presenting corresponding information on the display unit of the mobile communication device 114. The information may include the MSISDN of the terminal 110 from which the request originates. If multiple groups of protected data exist, the presented information also specifies the group to which access is desired. When the information is displayed, the card owner is given the opportunity to give his consent to the request, i.e. to allow access to the protected data stored in the memory card 102, or to dismiss the request. In order to give his consent to the request, the user may operate the input unit of the mobile communication device 114 in a predetermined way. For instance, the user may operate a predetermined key, if the input unit is configured as a keypad. If the user wants to dismiss the request, he operates the input device in a different prescribed way.

The authorisation component may not answer the request unless the user gives his consent within a predetermined time interval. After the time interval has lapsed, the information is removed from the display unit. If the authorisation component determines that the user has given his consent within the time interval, it generates an answer to the request. The answer includes the credential, which is necessary for accessing the protected data, or the decryption key for decrypting the data. If multiple groups of protected data are stored in the memory card 102, the authorisation component identifies the group to which access is desired using the corresponding information in the request and determines the credential or the cryptographic key allocated to this group and includes the credential or key in the answer.

After having generated the answer including the necessary credential or key, the authorisation component controls the mobile communication device 114 to send the answer to the terminal 110 via the mobile communication network 112. For this purpose, the answer is, in particular, addressed using the MSISDN of the terminal 110, which was included in the request.

In the terminal 110 the answer to the request is processed by the access component. In particular, the access component recognizes the credential or the key for accessing the protected data in the memory card 102 and extracts this information from the answer. If a credential is provided, the access component forwards the extracted credential to the memory card 102. The security logic of the memory card 102 verifies the credential, and if the credential has been verified successfully, the security logic allows the terminal 110 or an application of the terminal 110 to access the protected data. As mentioned before, the allowed access may be restricted to a reading access, or it may be also allowed to manipulate data using the terminal 110. If the answer to the request includes a decryption key, the decryption key is used in the terminal 110 for decrypting the data or the decryption key is forwarded to the memory card 102 and used by the microcontroller 106 of the memory card 102 to decrypt the data and make it accessible to the terminal 110 or an application executed in the terminal 110.

In order to increase security in the system described before, it may be provided that the answer to the request of the terminal is cryptographically secured. For this purpose, asymmetric encryption may be used. Here, the authorisation component may encrypt the answer to the request before sending it to the terminal 110. For encrypting the answer, the public key of the memory card 102 may be used. When the answer is received in the terminal 110, it is passed to the memory card 102 that decrypts the answer using its secret key, before the answer is processed in the access component. In another exemplary embodiment, the authorisation unit digitally signs the answer to the request using a secret key allocated to the authorisation unit. In this case, the memory card 102 verifies the digital signature using a public key of the authorisation component. The public key is securely stored in the memory card 102. This means that it cannot be replaced by another public key.

It should be noted that no cryptographic key of the terminal 110 is used in the mechanism described before so that a key exchange between the mobile communication device 114 and the terminal 110 is not necessary. Thus the memory card 102 can be accessed using the terminal 110 ad hoc without the need for preparing data exchange.

Furthermore, the card owner may want to restrict the authorisation of a person to access the protected data on the card to a limited period of time or to a defined number of accesses. For this purpose, after the time period has lapsed a new credential may be used or the data may be encrypted using another cryptographic key. This prevents the user of terminal 110 to store the received credential or key after the time period has lapsed.

In one exemplary embodiment, a new credential may be generated in the mobile communication device 114 of the card owner, particularly in the card owner's SIM card 118, and the SIM card 118 may provide a functionality to install the new credential in the memory card 102, when the memory card 102 is connected to the mobile communication device 114. Here, the security logic of the memory card 102 may not allow the installation unless a further credential is provided, which is only known to the card owner. Similarly, the mobile communication device 114, particularly the SIM card 118, may provide a functionality for decrypting the data and encrypting it using a new key.

In further exemplary embodiments, the answer of the device 114 to the request may comprise time information in addition to the credential or instead of the credential. The time information may specify a point in time, i.e. an absolute time, up to which the protected data stored in the memory card 102 can be accessed using the terminal 110. The time information may be input by the card owner when operating the device 114 to give his consent to the access to the protected data.

Before the memory card 102 allows the terminal 110 to access the protected data stored in the memory 104, it receives time information from a clock unit. The clock unit may be included in a time server, which is connected to terminal 110 via the communication network 112. Information for establishing a connection to the time server 116, such as the network address of the time server 116, is securely stored in the memory card 102. The data exchange between the memory card 102 and the time server may be based on the HTTP (hypertext transfer protocol). In one exemplary embodiment, there may be a "continuous" connection between the memory card 102 and the time server 116 via the terminal 110 using the HTTP. This means, that a protocol conversion of the request of the memory card 102 for providing time information and of the answer of the time server 116 can be dispensed with. In another exemplary embodiment, the time information generated by a clock unit contained in the mobile communication device 114 of the card owner and is included in the answer to the request of the terminal 110.

The time information provided by the clock unit specifies the current time as measured in the clock unit. Furthermore, the time information is cryptographically secured in such a way that a recipient can verify that the time information originates from the clock unit and that the time information was not modified during transmission to the recipient.

If the time information is provided by the mobile communication device 114 in the answer to the request, it may be secured in the same way as the request itself.

If the time information is retrieved from a time server, the time information is encrypted using a secret encryption key of the time server. As an alternative the time information includes a digital signature of the server, i.e. check value, which is derived from the content of the information and encrypted using the secret key of the clock unit. The secret encryption key is part of an asymmetric key pair further including a public decryption key for decrypting data, which has been encrypted using the secret encryption key. The public decryption key of the clock unit is securely stored in the memory card 102. The secure storage prevents the key from being replaced by another key. As an alternative to the utilisation of asymmetric key pair, it is likewise possible to utilise symmetric encryption with a key for encryption and decryption that is shared between the clock unit and the memory card 102. When the memory card 102 receives the time information, it verifies the authenticity of the time information. For this purpose, the memory card 102 decrypts the time information or the digital signature with the public decryption key, thereby verifying the authenticity and integrity of the time information. If a digital signature is used, the memory card 102 decrypts the check value thereby confirming that the time information originates from the clock unit. Then, the memory card 102 compares the check value to a self-generated check value and determines that the time information is unaltered, if both check values match.

If the authenticity of the time information cannot be verified successfully, the memory card 102 denies access to the protected data stored in the memory card 102. After the authenticity and integrity of the time information has been validated successfully, the memory card 102 compares the time information with the point in time that was specified by the card owner. If this point in time follows the point in time specified in the time information received from the time server or the clock unit of the mobile communication device 114, the memory card 102 allows accessing the protected data stored in the memory card 102 using the terminal 110.

In order to determine when the stored point in time is reached, the memory card 102 may determine a difference between the time indicated by the clock unit and the point in time specified by the card owner. Then, the memory card 102 starts an internal time counter. When a counter value corresponding to the calculated time difference has been reached, the memory card 102 determines that the time period corresponding to the calculated difference is lapsed and locks the protected data again against access from outside the memory card 102.

In another exemplary embodiment, the memory card 102 may repeatedly retrieve time information from the time server. In particular, the memory card 102 may retrieve the time information in regular, predetermined time intervals, which are not too long so that the user of the terminal 110 does not have access to the protected information significantly later than the stored point in time. Each time the memory card 102 retrieves time information from the time server, it compares the time specified in the time information with the point in time specified by the card owner and unlocks the protected data when the point in time specified by the card owner is no longer in the future relative to the current time as specified in the time information retrieved from the time server. The memory card 102 may also lock the protected data, if the time information received from the time server cannot be verified successfully. The memory card may also lock the protected data, if time information cannot be retrieved from the time server, since in this case, the memory card is not able to determine, whether the point of time specified by the card owner has been reached.

Further exemplary embodiments may differ from the embodiments described before in that the card owner specifies a time period for accessing the memory card 102 instead of an absolute point in time up to which the memory card 102 can be accessed.

In an exemplary embodiment of the invention, a time server may likewise be used. Here, the memory card 102 may store the time information it retrieves from the time server when the memory card retrieves the time information for the first time. Then, the memory card may again repeatedly retrieve time information from the time server 116. Each time the memory unit retrieves time information from the time server 116, it compares the time specified in the time information with the stored time and locks the protected data again when the difference between these times exceeds the time period specified by the user. In other respects, the security mechanism may be the same as in the exemplary embodiments described before. In particular, the memory card 102 may lock the protected data, if no time information can be retrieved from the time server, if the retrieved time information cannot be authenticated successfully and if time information received from the time server 116 specifies an earlier time than time information received before.

In a further exemplary embodiment, in which the user specifies a time period for accessing the memory card 102 instead of an absolute point in time up to which the memory card 102 can be accessed, the memory card 102 utilises an internal time counter for determining, whether the time period has lapsed. The time counter is started, after the answer of the mobile communication device 114 is received in the terminal 110. When a counter value corresponding to the specified time period has been reached, the memory card 102 determines that the time period has lapsed and locks the protected data again against access from outside the memory card 102.

The exemplary embodiments described before may allow the card owner to specify a point in time up to which the protected data stored in the memory card 102 can be accessed by another person using a terminal 110 or a time period for accessing the data. The card owner may specify the point in time or the time period before handing over the memory card 102 to another person. By specifying a suitable short time period, in which the other person can access the protected data, it can be prevented that unauthorized third parties can access the protected data. Thus, access to the protected data can be limited to selected persons in secure way.

While exemplary embodiments of the invention have been illustrated and described in detail in the drawings and foregoing description, such illustration and description are to be considered illustrative or exemplary and not restrictive; the invention is not limited to the disclosed embodiments.

For example, it is possible to operate an exemplary embodiment of the invention wherein the communication network 112 is not configured as mobile communication network 112 but as another communication network suitable for connecting the device 114 of the owner of the memory card 102 and the terminal 110.

Other variations to the disclosed exemplary embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A method for providing access to data securely stored in a memory card, the method comprising:
    receiving the memory card with the data stored therein in a terminal;
    transmitting a request for accessing the data via a communication link from the terminal to a device;
    sending first information from the device to the terminal via the communication link upon receipt of the request, the first information being sent to the terminal in response to a user operation acquired from a user interface of the device; and
    receiving the first information in the terminal and accessing the data using the first information.

2. The method according to claim 1, wherein the device comprises a mobile communication device and the communication link comprises a mobile communication network.

3. The method according to claim 1, wherein the device comprises a SIM card providing the first information.

4. The method according to claim 1, wherein the communication link from the terminal to the device is established using second information, the second information being read from the memory card by the terminal.

5. The method according to claim 4, wherein the second information comprises an MSISDN of the device.

6. The method according to claim 1, wherein the request for accessing the data includes a digital signature of the memory card, the digital signature being verified in a SIM card of the device.

7. The method according to claim 1, wherein the data is stored in encrypted form in the memory card, and wherein the first information comprises a cryptographic key for decrypting the data.

8. The method according to claim 1, wherein the memory card comprises a security logic allowing accessing the data after having successfully verified the first information.

9. The method according to claim 1, wherein the memory card comprises further data, which are not accessible using the first information.

10. A system, comprising:
    a terminal for accessing data stored in a memory card, the terminal comprising:
    an acceptance device that is adapted to receive the memory card with the data stored therein;
    a reading device adapted to read the data from the memory card using first information;
    a sending component adapted to send a request for accessing the data via a communication link; and
    a receiving component adapted to receive the first information via the communication link in response to the request; and
    a device that comprises an authorising component coupled to a user interface, the authorising component being adapted to provide the first information in response to a receipt of the request in the device and a user operation acquired from the user interface.

11. The system according to claim 10, wherein the device comprises a mobile communication device and the communication link includes a mobile communication network.

12. The system according to claim 10, comprising a SIM card including the authorising component.

13. The system according to claim 10, wherein the communication link is established using second information, the second information being read from the memory card by the terminal.

14. The system according to claim 10, wherein the second information comprises an MSISDN of the device.

* * * * *